Patented Sept. 16, 1941

2,256,153

UNITED STATES PATENT OFFICE 2,256,153

TIRE CORD AND THE LIKE

Theodore A. Riehl, Akron, Ohio, assignor to Wingfoot Corporation, Wilmington, Del., a corporation of Delaware No Drawing. Application June 12, 1936
Serial No. 84,979

6 Claims. (Cl. 154—46)

This invention relates to an improved cord for use in tires or other rubber articles requiring reinforcement. More particularly, the invention relates to a rayon cord coated with a latex composition which contains an antioxidant or age resistor.

In the construction of rubber articles, particularly tires, a carcass containing textile materials of one kind or another is often used, the fabric or web being made up of threads or cords which are embedded in the rubber and fixed therein by an adhesive which serves as a bond between cord and rubber. Usually, cotton is used but, more recently, rayon has been found to have certain valuable properties for this purpose, the rayon cords being more resistant to heat generated in a tire or derived from a hot road surface than is cotton. In other words, the hot tensile strength of rayon is greater than the hot tensile strength of cotton.

However, it has been discovered that the advantages attendant upon the use of rayon in tire carcasses may be improved upon by the exercise of the present invention. The improved results are attained by incorporating an antioxidant in the latex coating customarily surrounding the rayon cord and serving to fix it in the rubber, the antioxidant being placed in the protein latex mixture which is applied to the cord. It is found that the presence of the antioxidant in the coating protects such coating and the cord itself from the deteriorating effects of oxidation, imparts greater resistance to the effects of heat during the necessary drying of the coated thread in manufacture, and imparts greater resistance to the breaking-down effect of flexing which causes the coating eventually to separate from the cord. This latter effect is particularly important since rayon filaments have a comparatively smooth surface as compared with cotton and the coating, consequently, obtains a less tenacious grip on the cord.

The invention may be carried out by admixing an antioxidant material, such as phenyl beta naphthylamine or aldol alpha naphthylamine, with the protein-latex solution such as casein-latex solution, before the latter is applied to the cord. Thus, a water suspension of either or both of these antioxidants, or of others, is made, using gelatin as a stabilizer and the desired amount of antioxidant, say 1 to 3% on the rubber, is then added to the casein-latex mix. Where an organic liquor is used in conjunction with the casein-latex mixture, the antioxidant can often be dissolved in the organic liquid medium and added with it, due regard being had to the proportion of antioxidant added.

Illustrating the practice of the invention as outlined above, adhesive compositions employing an antioxidant were made up and tested against a control of the same formula but omitting the antioxidant. The tests were performed by embedding the cord coated with the adhesive in two small blocks of rubber and then exerting a pull on these blocks. The reading obtained on the testing machine at the moment when the cord was pulled out of one of the rubber blocks was taken as the adhesive strength of the sample since the adhesion of cord to rubber depends upon the strength of the adhesive coating joining the two. In some cases adhesion was so great that the cord broke. Some results so obtained follow, the composition being expressed in parts and the adhesion in pounds:

| Composition | A | | B | | C | |
|---|---|---|---|---|---|---|
| Casein | .1 | 1 | 2 | 2 | 0 | 0 |
| 40% rubber latex | 10 | 10 | 20 | 20 | 10 | 10 |
| Water | 13 | 12.95 | 28 | 27.7 | 10 | 9.85 |
| Antioxidant suspension | 0 | .15 | 0 | .3 | 0 | .15 |
| Adhesion room temp. ⅜" test length | 16.4 17.3 Aged 12 wk. 100° F. 85% rel. hum. | 16.7 19.3 | 13.81 Aged 32 hrs. at 220° F. | 14.4 | 16.0 Dried at room temp. 1 hr. and at 250° F. 30 mins. | 17.6 |
| Adhesion 250° F. ⅜" test length | | | 9.4 Aged 32 hrs. at 220° F. | 10.5 | | |

The antioxidant suspension employed in the foregoing adhesive compositions was made up as follows:

| | Grams |
|---|---|
| Water | 79 |
| Phenyl beta naphthylamine | 10 |
| Aldol alpha naphthylamine | 10 |
| Gelatin | 1 |

It will be observed from the foregoing data that cords coated with composition A containing a small portion of an antioxidant had better adhesion for rubber at the end of 12 weeks of low temperature ageing than did cords coated with the same adhesive from which the antioxidant was omitted. Likewise, cords coated with adhesive B, containing approximately the same proportion of antioxidant as adhesive A, showed better adhesion after 32 hours of high temperature ageing, when an antioxidant was employed. Adhesive C was made up without casein to test the effect of the antioxidant upon rubber alone. The coated threads were dried at room temperature for one hour and an additional 30 minutes at 250° F. These conditions are not as severe as those to which adhesives A and B were subjected, being only the customary drying conditions employed in the preparation of the coated thread. Here, also, the use of an antioxidant gave better results, showing a protective action during the necessary drying of the threads or cords. This advantage was evidenced both when the adhesion was tested at room temperature on a ⅜ inch test length of cord and when the adhesion was measured at 250° F. on a ⅝ inch test length of cord. When it is considered that this improved adhesion is tested on a very small length of cord, such as ⅜ inch or ⅝ inch, it will be seen that the total improvement in adhesion of a long cord embedded in a rubber tire, or other rubber article, is very great. In addition to the improved adhesion of cord to rubber and in addition to the improved resistance to heat during drying, the antioxidant also resists normal degradation of the rubber due to oxidation or other deleterious influences.

In actual practice, the results obtained in the tabulated tests were used in preparing an adhesive formula having the following composition:

| | Pounds |
|---|---|
| Casein | 3.00 |
| Borax | .45 |
| Water | 56.38 |
| Phenyl beta naphthylamine | 1.6 |
| Gelatin | .002 |
| Ammonium alginate | .002 |
| 40% rubber latex | 40.00 |

The antioxidant was incorporated in this formula by making up a suspension of the same as follows:

| | Pounds |
|---|---|
| Water | 55.5 |
| Phenyl beta naphthylamine | 24.0 |
| Gelatin | 0.24 |
| Ammonium alginate | 0.24 |

Of course, the adhesive formula and the antioxidant suspension used in preparing it may be varied within wide limits without departing from the scope of the invention. The antioxidant can also be varied although, in general, one having appreciable solubility in the rubber will be preferred. The proportion of antioxidant present should probably not exceed 3% of the total solids, although this figure will vary according to the solubility of the antioxidant used, since it is found that adhesion tends to approach a maximum and then to decrease as the proportion of antioxidant increases.

Among the many other different substances which can be used as antioxidants or age registers in the exercise of the invention there may be mentioned phenyl alpha naphthylamine, phenyltetrahydro alpha or beta naphthylamine, either the AR or AC forms such as phenyl AR tetrahydro beta naphthylamine, phenyl tolyl amine, diphenyl p-phenylene diamine, hydroxy diphenylamine, methoxy diphenylamine, methoxy phenyl beta naphthylamine, mixtures of two or more amines, such as a mixture of phenyl beta naphthylamine and diphenyl p-phenylene diamine, a mixture of phenyl tetrahydro beta naphthylamine, diphenyl p-phenylene diamine and phenyl beta naphthylamine, and composite reaction products of undetermined constitution such as that obtained when commercial cresol and aniline are reacted or that obtainable by reacting hydroquinone and aniline.

While the invention is most useful in connection with rayon cords due to the comparative smoothness of rayon filaments and the consequent weaker bond with the adhesive, the fact that the antioxidant protects both the latex coating and the cord which the coating surrounds makes it useful with any textile cord employed in the building of rubber articles, such as ramie, linen, silk acetate, silk, hemp, etc., all of which may thus be protected from the deteriorating effects of oxidation, heating, flexing, and the like. However, the invention is intended more particularly for use in connection with rayon cords since these are most subject to separation of the coating from the cord due to the aforementioned smoother surface of rayon as compared with that of cotton and certain other textile fibers. It will also be understood that, while the invention has been more particularly described in connection with casein-latex mixtures employed for applying a rubber coating to cords, the method can also be utilized in connection with other coating compositions which contain rubber, latex, balata, synthetic rubber, and other rubber-like materials, whether or not casein is also present or is replaced by other proteins, such as glue, albumin, gelatin, haemoglobin, or other adhesives.

It will be apparent that, in the practice of the invention, various changes may be made in the procedure to be followed and the materials employed without departing from the inventive concept. The examples given herein are presented as illustrative merely and it is intended that the patent shall cover, by suitable expression in the appended claims, all features of patentable novelty residing in the invention.

What I claim is:

1. A cord made up of a core of textile material and a coating on said core comprising a rubber-containing mixture including a diaryl amine.

2. A cord made up of rayon core and a coating on said core comprising a protein-latex mixture containing a diaryl amine.

3. A cord made up of a core of rayon and a coating on said core comprising a casein-latex mixture containing phenyl beta naphthylamine.

4. A cord made up of a core of rayon and a coating on said core comprising a casein-latex mixture containing aldol-alpha naphthylamine.

5. A cord made up of a core of rayon and a coating on said core comprising a casein-latex mixture containing phenyl AR tetrahydro beta naphthylamine.

6. A rubber article having embodied therein cords made up of a core of rayon fibers, said core being coated with a casein-latex mixture containing an age resister which promotes continued adhesion between the rayon cord and the rubber.

THEODORE A. RIEHL.